United States Patent [19]

Lee

[11] 4,240,830
[45] Dec. 23, 1980

[54] METHOD FOR MAKING SINTERED METAL-COATED GRAPHITE FOR HIGH-CURRENT COLLECTOR BRUSHES

[75] Inventor: Pang K. Lee, Murrysville, Pa.

[73] Assignee: Westinghouse Electric Corp., Pittsburgh, Pa.

[21] Appl. No.: 965,014

[22] Filed: Nov. 30, 1978

[51] Int. Cl.³ .............................................. B22F 3/00
[52] U.S. Cl. ..................................... 75/212; 427/217; 427/314
[58] Field of Search ................... 427/217, 314; 75/212

[56] References Cited

U.S. PATENT DOCUMENTS

| 2,729,559 | 1/1956 | Matsukawa | 75/212 |
| 3,535,093 | 10/1970 | Sara | 75/212 |
| 3,904,405 | 9/1975 | Russell et al. | 75/212 |

FOREIGN PATENT DOCUMENTS 599928 11/1978 U.S.S.R. .................................... 75/217

OTHER PUBLICATIONS

Lupanov et al., Chemical Abstracts V69(1968), p. 10554 Abstract #112779(s).
Pavlenko et al., Porosh. Met. No. 2 (158), 1976.

Primary Examiner—Brooks H. Hunt
Attorney, Agent, or Firm—G. H. Telfer

[57] ABSTRACT

Graphite particles as small as 38 microns are cleaned, dried and chemically plated with copper or silver. One or multiple chemical platings may be carried out to provide a uniform and thick metal coating. The plated powders are dried and then molded into a desired shape under heavy pressure in a hydraulic press or the like after which the molded shape is sintered under a hydrogen atmosphere for the subsequent fabrication into monolithic or multi-elemental brushes for high-current collectors.

9 Claims, 3 Drawing Figures

METHOD FOR MAKING SINTERED METAL-COATED GRAPHITE FOR HIGH-CURRENT COLLECTOR BRUSHES

BACKGROUND OF THE INVENTION

This invention relates to a method for making an electrical contact brush by chemically plating a metal coating onto graphite powder which is then dried and molded under heavy pressure for subsequent sintering in a hydrogen atmosphere to provide a metal-graphite composite suitable for forming into a monolithic or multielemental brush for high-current collectors.

Conventional monolithic solid brushes for electrical power transfer in sliding contacts are made of graphite, carbon-graphite, or metal-graphite composites. Graphite has unique antifriction properties when used for sliding contacts but has serious deficiencies which include brittleness, low strength and relatively poor conduction. Such deficiencies may be overcome by the addition of a metal such as copper or silver into the graphite. However, a monolithic brush made from such composite materials by conventional processes will not successfully operate under extremely high-current densities, e.g., 155 amp/cm$^2$ and high sliding speeds, e.g., 70 m/sec. with a requisite low energy loss (electrical plus mechanical), a low wear rate and a high conduction rate of electricity and heat. In such brushes, the conducting and lubricating constituents must be utilized very efficiently. Inefficient utilization of the metal conducting constituent adversely affects the lubricity of the brush.

Two techniques are generally employed to fabricate conventional metal-graphite brushes. The first is a powder metallurgy technique which involves solidstate sintering of a premolded powder mixture and hotpressing of the powder mixture. The second is a metal infiltration technique which involves pressure infiltration of molten metal into the skeletal structure of the graphite. The infiltration technique is sometimes employed for making composites consisting of a low-melting point metal and a refractory metal or material. Neither of these known techniques affords an efficient usage of the metal constituent. A uniform mechanical powder mixture of metal and graphite is difficult to achieve because of the great difference between the densities of the two constituent components. Moreover, graphite powder will smear over the surface of the metal particles, thus preventing metal-to-metal direct contact to form a continuous metal matrix upon molding and sintering. In the infiltration technique, the metal filaments in the graphite skeletal structures are not continuous when cold since the thermal expansion coefficients of the metal and graphite differ by a factor of 3 or more. Metallographs of conventional metal-graphite brushes reveal such metal discontinuities. The electrical resistivities of these commercial metal-graphite brushes are relatively too high in terms of their metal contents.

Recent studies indicate an improvement to the electrical resistivity by a copper-graphite composite consisting of sintered mixtures of copper powder and copper-coated graphite powder. Such composites were compared with a composite of sintered copper and bare graphite powders. The copper coating, up to 50% by weight, on the graphite particles was achieved by electrolytic plating. Further improvements to the copper coating technique was achieved by chemical plus electrolytic platings. Efficient plating to achieve complete coverage was limited to the use of relatively large graphite particles, i.e., 100–160 microns. However, particles of this size are much larger than the size of graphite powder for practical use in brushes. Experience with the present invention indicates that a metal content, copper or silver, in a metal-graphite brush must be higher than 50%, by weight, for useful application in high-current collection systems. Mixtures of copper powder and copper-coated graphite particles are not uniform because of large density differences. Moreover, graphite powders have a flake-like configuration and cannot be evenly plated by electrolytic deposition when agglomeration is unavoidable.

SUMMARY OF THE INVENTION

It is an object of the present invention to efficiently utilize a metal conducting constituent in brush material structures through the use of sintering powders composed of only metal-coated particles.

It is a further object of the present invention to provide a method of making an electrical contact brush by coating graphite powders as small as 38 microns with copper or silver through chemical plating for subsequent molding into solid blocks under heavy pressure for monolithic brush fabrication after sintering within a hydrogen atmosphere.

More particularly, according to the present invention, there is provided a method of making an electrical contact brush comprising preparing a quantity of graphite powder, mixing the graphite powder in a plating solution to plate each grain of powder with a metal, drying the plated powder, molding the dried plated powder to a desired shape under heavy pressure and sintering the molded powder in an atmosphere of hydrogen.

In the preferred aspect of the present invention, the metal which is plated onto the grains of graphite powder is selected from the group consisting of silver and copper. Prior to plating, the graphite powder is heated to a temperature of about 1000° C. in a hydrogen atmosphere after which the powder is treated with a sensitizing and an activating solution. The drying of plated powder is preferably carried out by heating the powder to a temperature in the range of 450° C.–500° C. in a hydrogen atmosphere. The method of the present invention may further include the step of wetting the dried plated powder with hydrocarbons before molding.

These features and advantages of the present invention as well as others will be more fully understood when the following description is read in light of the accompanying drawings, in which.

The method of the present invention is particularly useful for making electrical contact brushes for efficient usage of a metal conducting constituent in the form of a relatively thick metal coating on graphite powder through chemical plating. The process of the present invention provides for the coating of graphite powders having a grain size down to 38 microns with copper or silver. Uniform and thick silver coatings up to 97.5 weight percent of the final product is carried out only by chemical plating. The silver-coated or copper-coated graphite powders are molded in a hydraulic press or the like into a solid block and then sintered under a hydrogen atmosphere for monolithic brush fabrication.

Figure 1:
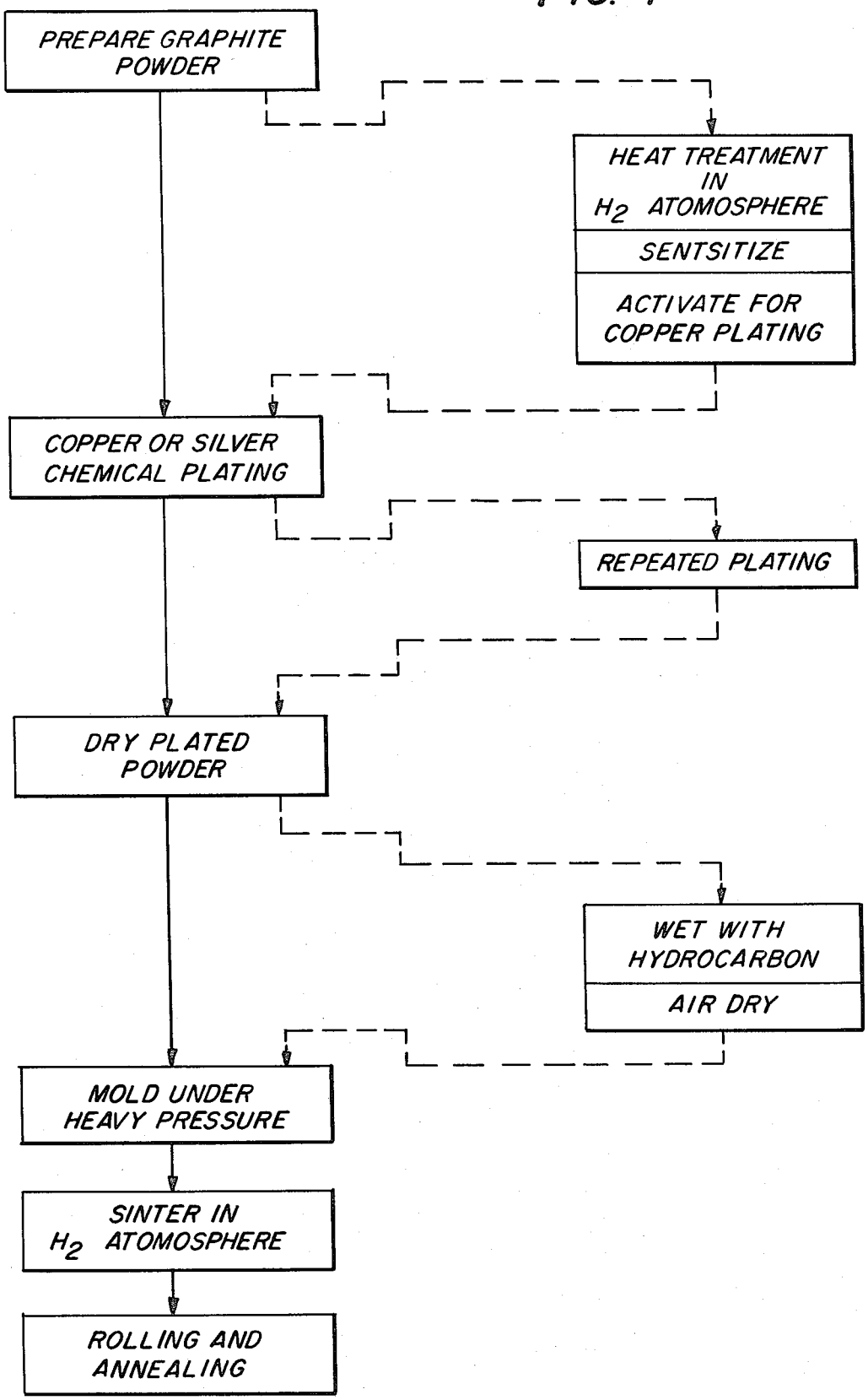
FIG. 1 is a flow diagram of the preferred method of the present invention.

FIG. 1 illustrates a flow diagram of the preferred method of making an electrical contact brush according to the present invention. According to the initial step in the method, natural graphite or electrographite (artificial graphite) is selected for the preparation of a quantity of graphite powder with a desired particle size. The size of graphite particles may be down to 75 microns and 38 microns at which sizes the particles are retained on a 400-mesh screen. It has been found that complete coverage and coating efficiency of the graphite powders by chemical plating is dependent upon surface cleanliness and the particle size of the powders. Preparation of the graphite powders includes heat treatment in a hydrogen atmosphere up to 1000° C. for 1 hour or more to remove any grease contamination due to the original processing of the powders. After the graphite powder has been heated in a hydrogen atmosphere, the powder is sensitized in a stannous-stannic chloride solution and when copper plating is undertaken, activation by contact with a silver nitrate solution is carried out. Both sensitization and activation are performed for 10-15 minutes followed by mild rinsing with deionized water.

A measured amount of plating solution is poured into an all-glass plating container arranged in a water bath wherein the temperature is controlled by suitable measures such as by simply adding ice to the water bath. After measured amounts of the plating solution are placed in the plating container, the temperature and concentration of the solution are adjusted. The plating solution is reduced by adding a formaldehyde solution. When undertaking the plating of copper onto graphite powder, the reducing agent is added to the solution immediately before the graphite powder is dispersed into the plating solution. When silver plating is undertaken, the reducing agent is added immediately after the graphite powder is placed into the plating solution. Vigorous stirring is continued throughout the plating process. To achieve complete plating of the graphite particles, diluting the plating solution and controlling the plating temperature are important plating parameters. A control over the total surface area of the graphite powders per unit volume of the plating system is a key factor for complete coating since chemical plating is autocatalytic and the reaction rate is proportional to surface area. Lowering the plating temperature facilitates uniform metal deposition but limitations arise because an inadequately low temperature inhibits the initiation of metal deposition. An optimum temperature for chemically plating fine grain graphite powders greater than or equal to 38 microns has been found to be approximately 15° C. for copper plating and 10° C. for silver plating. The use of optimum plating temperatures is of greatest importance for the first chemical plating process when multi-coatings are being undertaken. Moreover, proper control of the plating condition minimizes a suspension of metal deposits in a colloidal state which is undesirable. The chemical plating process ceases when the evolution of tiny hydrogen bubbles cease and when the copper plating solution becomes colorless. The coated graphite powder is then removed from the plating solution, thoroughly washed by decantation, filtered, washed and dried. For multiple chemical plating operations, coated graphite obtained by decantation from a previous plating operation is dispersed into a second plating container with a new batch of plating solution and the plating operation is repeated. As the coated graphite powder becomes heavier due to repeated plating, the mixing operation by stirring during the plating process becomes less efficient. Vigorous mixing may be effectively obtained through other processes, such as the use of a ball-mill roller.

The plated powders are then dried in a hydrogen atmosphere at 450° C.–500° C. to remove moisture. In carrying out the drying process, there is an attendent reduction of the surface oxides on copper-coated graphite powder. In the preferred form of the invention, the dried powders are wetted with hydrocarbons, such as petroleum ether and mixed for 1 hour. Immediately before molding, the plated powder wet with hydrocarbons is air-dried at room temperature for about 5 minutes to reduce the amount of hydrocarbons for controlling microporosities of the final compact material. The metal-coated graphite powder is then fabricated to form a compact solid brush material in a two-step process. In the first step, the metal-coated graphite is molded to a desired shape under heavy pressure and then in the second step, the molded article is sintered in a hydrogen atmosphere at temperatures of 800° C. or higher for about 1 hour. Molding pressures and sintering temperatures may be varied for different metal-coated powders in order to optimize the electrical resistivity and the microstructure in the resulting compact brush material. Appropriate molding pressures are 21 kN/cm$^2$ and 17 kN/cm$^2$ for copper-coated powder and silver-coated powder, respectively. Appropriate sintering temperatures are 900° C. for copper-coated powder and 800° C. for silver-coated powder. The overall electrical resistivity of the composites is much lower than conventional metal-graphite brushes as will be described hereinafter in greater detail in regard to FIGS. 2 and 3. As the concluding step in the process, metal-rich composites, i.e., 97.5% silver, can be successively rolled down to sheet-like form 9 mils thick (228 microns). The thin sheets may be sliced into ribbons or slotted into comb-like structures for fabrication of multi-elemental brushes. Both monolithic and multi-elemental brushes are specifically useful for high-current collectors.

It has been found that metal-rich powders may be fabricated into thin sheets or foils for use as multi-elemental brush materials. Without hydrocarbon impregnation, the powders are molded into thin plates of about 0.06–0.08 centimeter thick. After sintering, such plates are cold-rolled by successive passes down to the thinnest sheet obtainable. During the rolling operation, intermittent annealing of the plates should be undertaken. The final sheets are also annealed at about 400° C. in a hydrogen atmosphere.

Tests are carried out using the method of the present invention as set forth in the foregoing description and the results are summarized in the following tables:

TABLE I

Typical Results of Coating Graphite Powder with Metals

| Run No. | Graphite Size μ | Graphite Weight g | Plating Conditions Plating Solution* ml | HCHO (37%) ml | Temp. °C. | Metal % Final Product |
|---|---|---|---|---|---|---|
| 1. | Copper-Plating (Chemical Plating) | | | | | |
| W2 | −180 + 150 | 40 | 1000 | 150 | 10–12 | 36.6 |
| W15 | −150 + 75 | 20 | 500 (+H₂O 500, dilution 1:1 compared to W2) | 75 | 13–17 | 41.5 |
| W29 | −75 + 38 | 20 | 1st 800 (+H₂O 800, dilution 1:1) | 100 | 14–16 | |
| | (Repeatedly plating) | | 2nd 800 (+H₂O 800, dilution 1:1) | 110 | 25 | 65.8 |
| 2. | Copper-Plating (Chem. Plating Followed by Electrolytic Plating | | | | | |
| W1 | −180 + 150 | 20 | 500 | 75 | 14–18 | 37.1 |
| | | | 600 (Electrolyte*) | — | 25 (1½ hr) | 58.8 |
| 3. | Silver-Plating (Chemical Plating) | | | | | |
| W5 | −180 + 150 | 40 | 160 (+H₂O 500) | 7 | 8 | 22.8 |
| W9 | −150 + 75 | 30 | 250 (+H₂O 800) | 10.5 | 10 | 34.0 |
| W23 | −75 + 45 | 10 | (1) 104 (H₂O 440) (+H₂O 334) (Total dilution 1:1 compared to W9) | 5 | 8.5 | 52.5 |
| | (Repeatedly plating) | | (2) Same as (1) | | 6 | 68.4 |
| | | | (3) 78 | | 6 | 75.0 |
| W32A | −45 + 38 | 10 | 155 (+H₂O 500) | 7 (+H₂O 400) | 10 | |
| | (Repeatedly Plating) | | Total of Four Platings | | | 86.0 |
| W32F | | 15 (W32A) | 268 (+H₂O 500) | 9 (+H₂O 400) | 22–23 | |
| | | | Total of Three Platings | | | 97.5 |

TABLE II

Relation of Electrical Resistivity of Sintered Coated Graphite with Varying Fabrication Conditions

| | | Electrical Resistivity μΩ-cm | | |
|---|---|---|---|---|
| | | Direction to Molding Load | | |
| | | Perpendicular | | |
| Molding Pressure KN/cm² | Sintering Temperature °C. | Between Sides #1 & #3 | Between Sides #2 & #4 | Parallel |
| 1. Copper-Coated Graphite (W15, 41.5% by Weight of Copper) | | | | |
| 11 | 900 | 18.95 | 16.08 | 102.7 |
| 17 | 900 | 19.88 | 13.54 | 99.3 |
| 21 | 900 | 17.55 | 18.68 | 94.2 |
| 14 | 1000 | 23.59 | 16.48 | 127 |
| 21 | 1000 | 22.49 | 18.27 | 110.7 |
| 2. Silver-Coated Graphite (W9, 34% by Weight of Silver) | | | | |
| 11 | 800 | 70.86 | 80.11 | 310.0 |
| 17 | 800 | 79.05 | 71.64 | 271.5 |
| 21 | 800 | 78.14 | 80.03 | 245 |
| 14 | 900 | 97.74 | 100.8 | 298.3 |
| 21 | 900 | 85.86 | 76.29 | 277.4 |

In these tests, Run No. W1 was carried out using chemically-plated graphite powder with a 58.8% copper coating for subsequent use in an electroplating process. By this technique, a more compact coating was obtained. However, it was found that a uniform and thick coating cannot be added by electrolytic plating because agglomeration of the coated particles is unavoidable upon plating.

Figure 2:
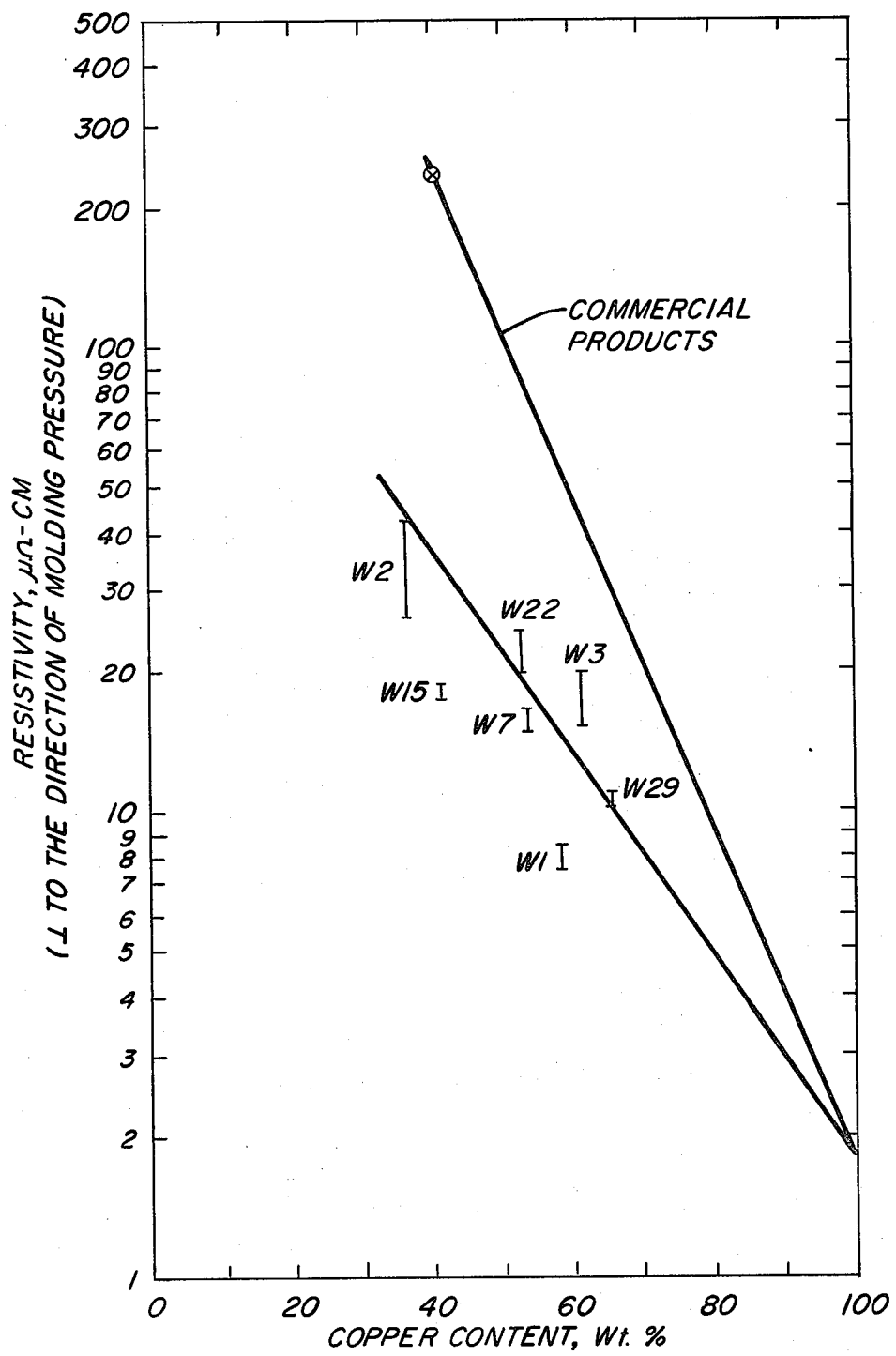
FIG. 2 is a graph showing electrical resistivity versus copper content of a sintered copper-coated graphite composite made according to the present invention and a plot point showing copper-graphite of a present commercial product.
Figure 3:
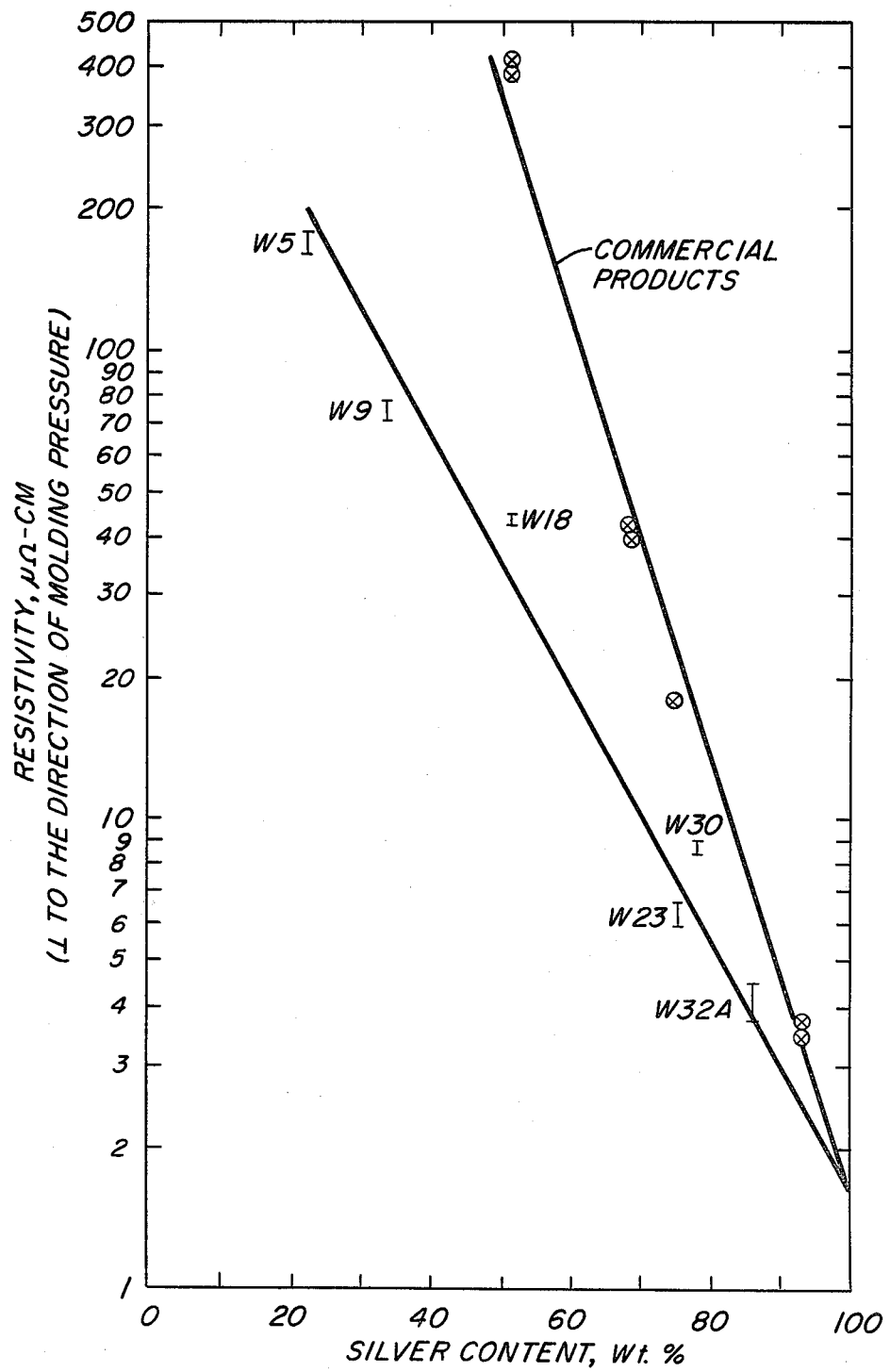
FIG. 3 is a graph similar to FIG. 2 but showing electrical resistivity versus silver content in silver-coated graphite.

To optimize the molding pressure and sintering temperature for fabrication conditions, Run No. W15 containing 41.5%, by weight, copper coating on graphite and Run No. W9 containing 34% silver coating by weight on graphite were separately fabricated at different pressures and temperatures. The electrical resistivity for the sintered material was measured. The results are summarized on Table II. For each sample, the electrical resistivities of low-temperature sintered materials increased with increased molding pressures. The resistivity decreases with higher sintering temperatures due to volume growth in the direction of the molding load. The microstructure of sintered metal-coated graphite was examined metallographically. Run No. W2 containing 36.6% copper, by weight, Run No. W9 containing 34% silver, by weight, and Run No. W32F containing 97.5% silver, by weight revealed, upon such examination, a structure of the continuous three-dimensional metal skeletons. In FIG. 2, the electrical resistivities of the sintered metal-coated graphite materials were measured and plotted against the copper content of the coated graphite material. In FIG. 3, plots based on similar measurements are shown in regard to silver-coated graphite. FIGS. 2 and 3 further include plot points along graph lines 10 and 11, respectively, showing resistivities of commercial copper and silver graphite brushes. The overall electrical resistivity of sintered metal-coated graphite of the present invention is always much lower than the commercial materials made by powder metallurgy techniques or by metal infiltration techniques. The deviation becomes greater at lower metal contents. Thus, for example, in FIG. 3 the electrical resistivity of sintered silver-coated graphite is 6 micro-ohm-centimeters at 75% silver and 44 micro-ohm-centimeters at 50% which compares to 18 micro-ohm-centimeters and 410 micro-ohm-centimeters, respectively, of commercial silver-graphite brushes. The sintered metal-coated graphite materials produced according to the present invention are more anisotropic. The high differences in anisotropy and electrical resistivity are attributed to the metal structure of the metal-graphite systems. Portions of the powders produced from Run No. W32F containing 97.5% silver, by weight, were molded into 8.28×2.64×0.80 centimeter plates under 17 kN/cm$^2$ and sintered at 800° C. The two molded pieces were cold-rolled down to 380 micrometer thicknesses by six rolling passes. After annealing at 800° C. for 15 minutes, the sheets were cold-rolled down to 229 micrometers (9 mils) thick by four rolling passes. One of the final sheets was again annealed in a hydrogen atmosphere at 400° C. for 3 hours. Both sheets were sliced into ribbons or slotted for fabrication of multi-elemental brushes.

Although the invention has been shown in connection with a certain specific embodiment, it will be readily apparent to those skilled in the art that various changes in form and arrangement of parts may be made to suit requirements without departing from the spirit and scope of the invention.

I claim:

1. A method of making an electrical contact brush comprising:
   preparing a quantity of graphite powder;
   heating said graphite powder in a hydrogen atmosphere to clean said powder;
   mixing the cleaned powder in a plating solution containing a metal selected from the group consisting of copper and silver to plate each grain of powder with a metal coating;
   drying the plated powder by heating in a hydrogen atmosphere;
   wetting the dried plated powder with hydrocarbons;
   molding the hydrocarbon wetted, plated powder to a desired shape under heavy pressure; and
   sintering the molded powder in an atmosphere of hydrogen.

2. The method according to claim 1 in which said graphite powder is treated prior to plating by heating to a temperature of about 1000° C. in a hydrogen atmosphere.

3. The method according to claim 1 in which said graphite powder is treated with a sensitizing solution prior to mixing in the plating solution.

4. The method according to claim 1 wherein said step of drying the plated powder includes heating in a temperature range of 450° C.–500° C. in a hydrogen atmosphere.

5. The method according to claim 1 wherein the prepared quantity of graphite powder has a grain size down to 38 microns.

6. A method according to claim 1 wherein:
   said heating of said graphite powder in a hydrogen atmosphere is at a temperature of about 1000° C. for at least one hour;
   said graphite powder is treated with a sensitizing solution prior to mixing in the plating solution;
   said drying the plated powder in a hydrogen atmosphere is in a temperature range of 450° C.–500° C.

7. A method according to claim 1 wherein:
   said metal is copper and said plating solution is at a temperature of about 15° C.

8. A method according to claim 1 wherein:
   said metal is silver and said plating solution is at a temperature of about 10° C.

9. A method according to claim 1 wherein:
   said molding is performed to form a relatively thin sheet; and the method comprises the further steps of cold rolling said sheet to a further reduced thickness, annealing the cold rolled sheet, and slicing the sheet into ribbons for fabrication of multi-elemental brushes.

* * * * *